United States Patent
Meyer

(10) Patent No.: US 6,570,936 B1
(45) Date of Patent: May 27, 2003

(54) FREQUENCY ERROR ESTIMATION METHOD AND SYSTEM FOR A QPSK DEMODULATOR

(75) Inventor: Jacques Meyer, St. Martin le Vinoux (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/358,868

(22) Filed: Jul. 22, 1999

(30) Foreign Application Priority Data

Jul. 23, 1998 (FR) .............................. 98 09578

(51) Int. Cl.⁷ .............................................. H04L 27/22
(52) U.S. Cl. ...................................... 375/329; 375/324
(58) Field of Search ................................. 375/329, 324, 375/326, 340, 344, 322

(56) References Cited

U.S. PATENT DOCUMENTS

| | | |
|---|---|---|
| 4,466,108 A | 8/1984 | Rhodes |
| 5,495,510 A | 2/1996 | Kimiavi |
| 5,579,345 A | 11/1996 | Kroeger et al. |
| 5,684,835 A | 11/1997 | Kroeger et al. |
| 5,940,450 A * | 8/1999 | Koslov et al. .............. 375/344 |

FOREIGN PATENT DOCUMENTS

| | | |
|---|---|---|
| EP | 0 355 587 | 2/1990 |
| EP | 0 491 403 A2 | 6/1992 |
| FR | 2 670 967 | 6/1992 |
| GB | 2 207 582 A | 2/1989 |
| WO | WO 93/11605 | 6/1993 |

OTHER PUBLICATIONS

French Search Report dated Mar. 31, 1999 with annex on French Application No. 98–09578.

* cited by examiner

*Primary Examiner*—Stephen Chin
*Assistant Examiner*—David B. Lugo
(74) *Attorney, Agent, or Firm*—Lisa K. Jorgenson; Stephen Bongini; Fleit, Kain, Gibbons, Gutman & Bongini, P.L.

(57) ABSTRACT

A method for estimating the frequency error of a demodulator for restoring two binary signals carried on two carriers of same frequency but in phase quadrature, including the steps of forming vectors having as components the successive couples of values of the two binary signals; applying to each vector a transform which multiplies by four its angle at least when it is equal to a multiple of π/4 and which substantially preserves its module; and calculating the average of the transformed vectors. The frequency error is obtained as being the derivative of the angle of the average vector.

18 Claims, 2 Drawing Sheets

FREQUENCY ERROR ESTIMATION METHOD AND SYSTEM FOR A QPSK DEMODULATOR

CROSS-REFERENCE TO RELATED APPLICATIONS

This application is a United States counterpart to and claims the benefit of the filing date of French Application No. 98/09578 dated Jul. 23, 1998, which is herein incorporated by reference.

FIELD OF THE INVENTION

The present invention generally relates to the field of QPSK (quadrature phase-shift keying) demodulators for restoring two binary signals carried by two carriers of same frequency but in phase quadrature. The present invention more specifically relates to an estimator of the error of the frequency on which a phase-locked loop of the demodulator is set.

BACKGROUND OF THE INVENTION

FIG. 1 shows, in the form of a constellation, couples of values, or symbols, corresponding to the successive values of the two binary signals restored by a demodulator. This constellation shows points, each of which has as coordinates values I and Q of the two binary signals at a given time. Theoretically, the points coincide with points P1 to P4 of respective coordinates (1, 1), (−1, 1), (−1, −1) and (1, −1).

However, as shown in the first quadrant of the constellation, points which should coincide with point P1 form a cloud of points around point P1 due to various errors and to noise in the transmission.

A QPSK demodulator is generally formed of a phase-locked loop (PLL) for setting the frequency of a local oscillator on the carrier frequency by an analysis of the constellation points. To filter the noise, the PLL has a very small bandwidth, on the order of one thousandth of the transmission frequency, or symbol frequency, of the binary signals. Thereby, the PLL also has a narrow capture range, which further decreases when the noise increases. This range is on the order of 0.5% of the symbol frequency with a 3-dB signal-to-noise ratio. The carrier frequency is generally not very well known and the offset can be several times the symbol frequency. Thus, if no specific measures are taken, the PLL does not succeed in setting on the carrier frequency.

When the frequency of the PLL is poorly adjusted, the constellation of received points rotates, as illustrated by arrows in FIG. 1, at a speed equal to the frequency error.

A first conventional solution to find a frequency within the capture range of the PLL consists of adjusting the PLL frequency on successive selected values until a locking of the PLL is detected. A PLL locking detection is a relatively slow operation which requires analyzing a large number of symbols for each tested frequency. The number of symbols to be analyzed increases with noise. In satellite transmissions, a signal-to-noise ratio as small as 3 dB is generally tolerated. In this case, several tens of thousands of symbols have to be analyzed to detect the locking, which considerably slows down the rate of the successive frequency tests and thus the speed at which the demodulator is set on the carrier frequency.

Other solutions use a frequency error estimator for bringing the demodulator frequency in a single attempt within its capture range. An example of frequency estimator is described in the paper entitled "Frequency Detectors for PLL Acquisition in Timing and Carrier Recovery" by David G. Messerschmitt, IEEE Transactions on Communications, Vol. 27, No. 9, September 1979.

This estimator exploits given properties of the signal and provides a value which is in principle proportional to the frequency error. However, this type of estimator provides the position of the gravity center of the signal spectrum and thus only is operative if this spectrum is symmetrical. In most real situations, the spectrum is not always symmetrical due to the characteristics of the signal transmission, which fluctuate with respect to the desired theoretical characteristics. Thus, the frequency value provided by the estimator fluctuates in practice by a few hundredths of the symbol frequency and often falls outside the PLL capture range.

A frequency error detector is described in the paper entitled "New Phase and Frequency Detectors for Carrier Recovery in PSK and QAM systems", by Hikmet Sari and Saïd Moridi, IEEE Transactions on Communications, Vol. 36, No. 9, September 1988. This detector analyzes the variation of the phase error of the PLL. Indeed, in the case of a frequency error, the phase varies linearly in time, modulo $\pi/2$ in a QPSK demodulator. In the absence of noise, the phase has a sawtooth-shaped variation between $-\pi/4$ and $\pi/4$, and the frequency corresponds to the slope of each of the ramps of the sawtooth. The system provides the measured phase error when it is included between a positive and a negative threshold, and provides the last value measured between these thresholds otherwise. However, in the presence of a strong noise, the points of each ramp are superposed to random errors which can often exceed $\pi/4$ in absolute value. It is then practically impossible to have a reliable result.

SUMMARY OF THE INVENTION

An object of the present invention is to provide an estimator of the frequency error of a QPSK demodulator, which is particularly reliable, even in the presence of strong noise. This object is achieved by a method for estimating the frequency error of a demodulator for restoring two binary signals carried on two carriers of same frequency but in phase quadrature, including the steps of forming vectors having as components the successive couples of values of the two binary signals; applying to each vector a transform which multiplies by four its angle at least when it is equal to a multiple of $\pi/4$ and which substantially preserves its module; and calculating the average of the transformed vectors.

According to an embodiment of the present invention, the transform is a rotation by four times the vector angle.

According to an embodiment of the present invention, the frequency error is provided by calculating the derivative of the angle of the average vector.

According to an embodiment of the present invention, the derivative is provided in the form of a difference, modulo $\pi/2$, of two successive angle values.

According to an embodiment of the present invention, the transform is a piecewise linear transform which makes correspond to each vector an image vector located substantially in the same quadrant of the image plane as an image vector obtained by multiplying by four the vector angle.

According to an embodiment of the present invention, a phase of 0 is assigned to the image vectors located in the second and third quadrants of the image plane, a phase of +1 is assigned to the image vectors located in the first quadrant, and a phase of −1 is assigned to the image vectors located in the fourth quadrant, a frequency error information being provided by the difference of the phase values assigned to the current image vector and to the preceding image vector, which difference is provided modulo 2 if it is positive, and modulo −2 if negative.

The foregoing objects, features and advantages of the present invention will be discussed in detail in the following non-limiting description of specific embodiments in connection with the accompanying drawings.

DETAILED DESCRIPTION OF PREFERRED EMBODIMENTS

Preferred embodiments of the present invention will be described in detail hereinbelow with reference to the attached drawings. To estimate the frequency error of a QPSK demodulator, the present invention provides calculating the average phase of the symbols and deriving this average phase to find the frequency error. A conventional phase detector could be used for this purpose, by further performing a low-pass filtering function on the phase values. This would result in a smoothing of the noise, thus enabling obtaining a variation close to a sawtooth of amplitude $\pi/2$.

However, in the presence of strong noise, a large number of instantaneous phase values exceed the amplitude limits of the sawtooth and generate erroneous contributions to the average calculation. For example, if the sawtooth varies between $-\pi/4$ and $\pi/4$, an instantaneous phase value $-\pi/4-\epsilon$ is transformed into a phase of value $\pi/4-\epsilon$, whereby this instantaneous phase is counted with a $\pi/2$ error in the average calculation.

In a very noisy surrounding, the probability of having such out-of-limit values is so high that the average value is too far from correct to be exploitable. To avoid these disadvantages, the present invention provides for calculating the average phase over symbols which have undergone a rotation of four times their initial angle while substantially keeping their module.

With such a transformation, any two symbols which have the same position modulo $\pi/2$ in the original constellation have the same absolute position in the image constellation. In other words, any error of $\pi/2$ which could be made by considering the phases in the original constellation due to the fact of not knowing which of the four symbols (I, Q) has been transmitted, is suppressed in the image constellation due to such a transformation. Indeed, any symbol with a $\pi/2$ error is confounded with the correct symbol in the image constellation.

Figure 1:
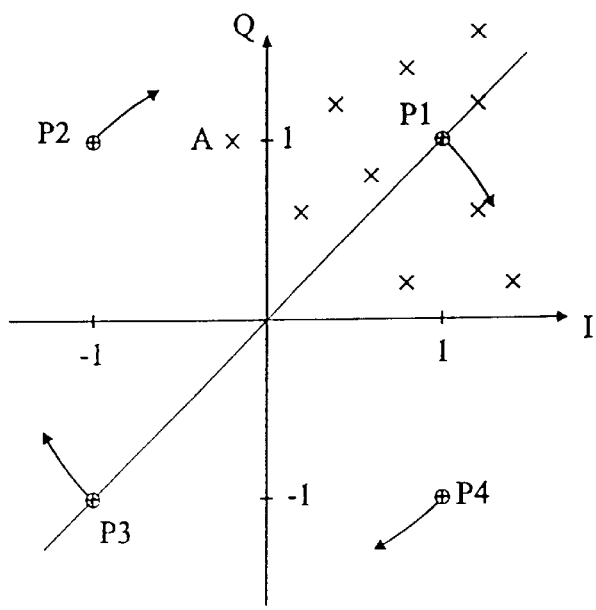
FIG. 1, previously described, shows a constellation corresponding to symbols restored by a QPSK demodulator.
Figure 2:
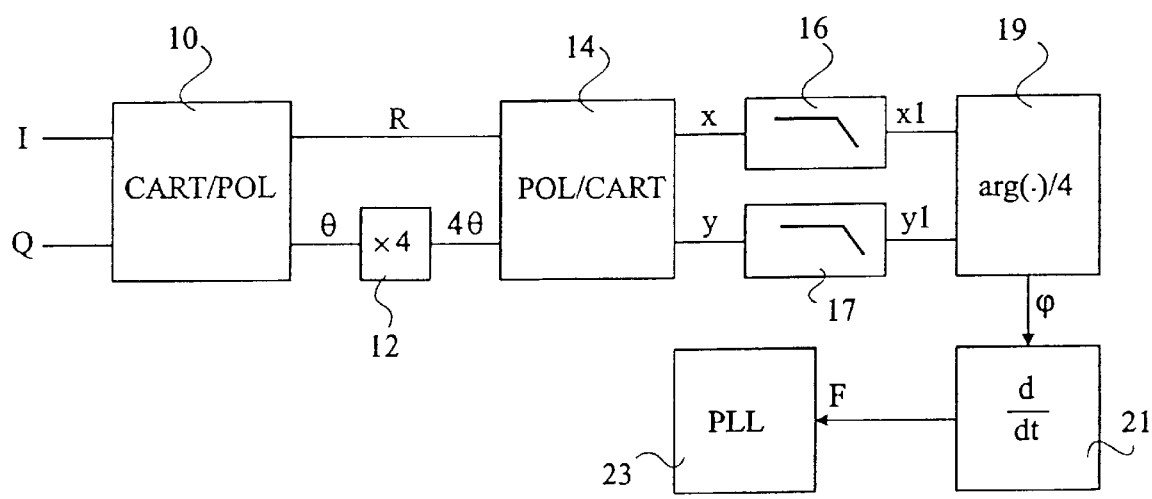
FIG. 2 shows a block diagram of a frequency error estimator according to the present invention.

FIG. 2 shows a simplified diagram of an example of a circuit implementing the above-mentioned method. The couples of values I and Q of the two binary signals restored by the demodulator are provided to a cartesian-to-polar converter 10 which calculates the module R of the vector of coordinates (I, Q) and the angle $\theta$ of this vector with the horizontal axis (I in FIG. 1). Angle $\theta$ is multiplied by 4 in block 12 before being provided, with module R, to a polar-to-cartesian converter 14 which calculates a corresponding couple of coordinates (x, y). The averages x1 and y1 of the variations of coordinates x and y are provided by respective low-pass filters 16 and 17. A circuit 19 provides one quarter of the argument of each vector of components (x1, y1) provided by filters 16 and 17. Thus, circuit 19 provides the average phase $\phi$ corresponding to the angle of the average of the vectors of components (I, Q), without the $\pi/2$ errors which could be caused by symbols having a phase error outside the $-\pi/4$ and $\pi/4$ limits.

A differentiating circuit 21 provides the searched frequency error (F) based on average phase $\phi$. This error is proportional to the difference (d) between two successive angles $\phi$, modulo $\pi/2$, that is, if the difference d is, for example, greater than $\pi/4$, then value $d-\pi/2$, which is included between $-\pi/4$ and $\pi/4$, is selected. Frequency error F can be readily used to correct the frequency reference value of a phase-locked loop 23.

It should be noted that the circuit of FIG. 2 does not directly calculate the average of the angles of the vectors having components (x, y), but first calculates the average of each of components (x and y), that is, an average vector, then calculates the angle of this average vector. This operating mode is an important aspect of the present invention. Indeed, it enables solving ambiguities when symbols are received close to axes I and Q of the constellation of FIG. 1.

For example, it is assumed that the received constellation is shifted by $-\pi/4$ with respect to the theoretical constellation, that is, the points corresponding to theoretical points P1 to P4 are on axes I and Q. The constellation phase will then be said to be null. Receiving a symbol of coordinates (1, $\epsilon$) corresponding to point P1 and a symbol of coordinates ($\epsilon$, 1) corresponding to point P2, where $\epsilon$ is a small parasitic component due to noise, is very likely. These points are at respective angles $\epsilon$ and $\pi/2-\epsilon$. Multiplying these angles by four respectively provides $4\epsilon$ and $2\Pi-4\epsilon$. The average of these angles, divided by 4, provides value $\pi/4$ as an estimation of the phase, which is incorrect since the phase is null in this example. However, since the vector components after transformation are respectively $(1, 4\epsilon)$ and $(1, -4\epsilon)$, the corresponding average vector, of components $(1, 0)$, has a null angle, which is the exact value of the phase of the received constellation.

It should further be noted that, if a transformation according to the present invention is not applied, neither the calculation of the average angle nor the calculation of the average vector provide a correct phase ($\pi/4$ in both cases).

The first calculation of the average vector also has the advantage of giving a preponderating effect to vectors of large module which have a higher probability of having a correct angle than vectors of small module. Indeed, a same noise component much less affects the angle of a vector of high module than the angle of a vector of low module.

The circuit of FIG. 2 is particularly complex to realize in practice due to the cartesian-to-polar and polar-to-cartesian converters which have to perform trigonometric calculations. This also applies to circuit 19 which provides the angle of the vector of components (x1, y1).

According to an embodiment of the present invention, a circuit providing a final result equivalent to that of FIG. 2, but which is simpler to realize, is provided. For this purpose, a linear transform is used which no longer transforms a circle into a circle as would the circuit of FIG. 2, but which multiplies by four the angles multiples of $\pi/4$. An example of such a transform is the following:

noting

Sup=max(|I|, |Q|)

Inf=min(|I|, |Q|), and

Sgn=sign (IQ (|I|−|Q|)),

If 4Inf<Sup then x=Sup and
  y=4SgnInf
  else x=2Sup−4Inf and
  y=2Sgn(Sup−Inf)

where I and Q are the components of the initial vectors and x and y are the components of the image vectors.

Figure 3:
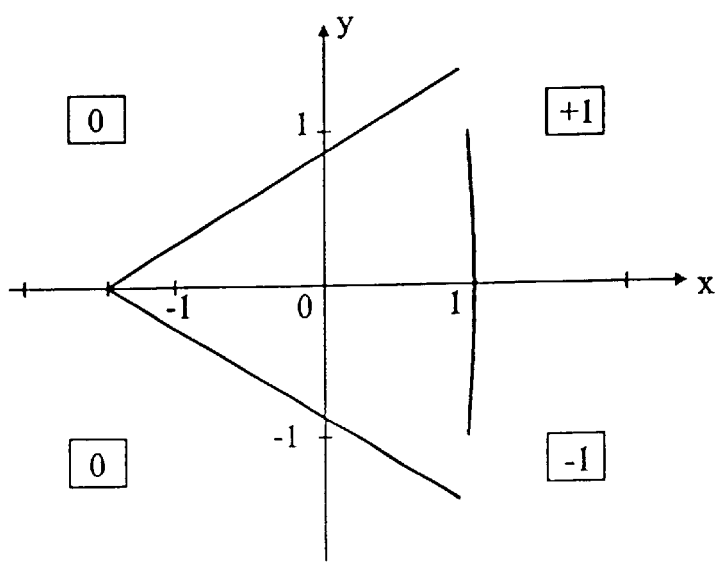
FIG. 3 illustrates the image of a circle of the constellation of FIG. 1 by a simplified transformation enabling obtaining a result equivalent to that which would be obtained by using the circuit of FIG. 2.

FIG. 3 shows the image obtained according to this transform of a circle of radius 1 of the constellation of FIG. 1. The images of theoretical points P1 to P4 are on the x-axis, on the negative side. The vectors having angles included between substantially 30° and 60° (modulo 90°) have images in the second and third quadrants of FIG. 3. The vectors having angles included between 0 and substantially 30° (modulo 90°) have images in the first quadrant, while the vectors having angles included between substantially 60° and 90° (modulo 90°) have images in the fourth quadrant.

As in the circuit of FIG. 2, low-pass filters 16 and 17 provide averages x1 and y1 of components x and y obtained after this transform. Other piecewise linear transforms could be envisaged. They should, however, as with the above transform, multiply by four at least the angle multiples of $\pi/4$.

Angle calculation and derivation circuits 19 and 21 of FIG. 2 may be kept in the design. However, angle calculation circuit 19 has to perform an arc tangent calculation, which is relatively complex and incompatible with the calculation simplification obtained by the preceding piecewise linear transform.

According to an embodiment, it is provided to only use the polarity of the average image angle to provide a frequency error indication. More precisely, if the average image point (x1, y1) is located in the second or third quadrant of FIG. 3, a zero value is assigned to phase $\phi$. If the average image point is located in the first quadrant, value 1 is assigned to phase $\phi$. Finally, if the average image point is located in the fourth quadrant, value −1 is assigned to phase $\phi$. The deriving performed by circuit 21 consists of subtracting the preceding value of phase $\phi$ to the current value, the result being provided modulo 2 if the difference is positive and modulo −2 if the difference is negative (in other words, the difference is annulled if it is equal to 2 or −2).

Thus, when the received constellation rotates at constant speed, this deriving provides a succession of values 1 or −1 (according to the rotation direction), separated by a same number of null values, the number of null values increasing when the rotation speed decreases.

This deriving thus does not readily provide a frequency value which can be applied as a reference to PLL 23, but positive or negative increments which are applied to this reference, the increments being all the closer together as the rotation speed of the received constellation is high.

The operations described here above will be generally performed on digital signals, for example, in a wired manner. The fact that the last described embodiment only requires linear calculations enables using a particularly simple hardwired circuit which does not have to perform trigonometric operations.

Figure 4:
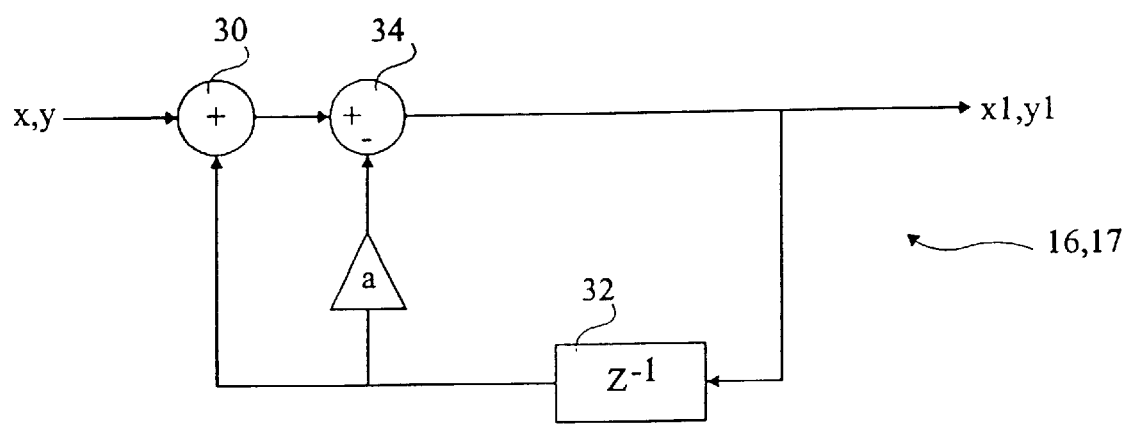
FIG. 4 is a block diagram of an example of an average filter used in the circuit of FIG. 2.

FIG. 4 shows a digital example of filters 16 and 17. Component x or y is provided to an adder 30 which also receives output x1 or y1 of the filter via a sample delay element 32. Output x1 or y1 of the filter is provided by a subtractor 34 which calculates the difference between the output of adder 30 and the output of delay element 32, multiplied by a coefficient $\underline{a}$. Good results are obtained with $\underline{a}=\frac{1}{8}$.

Of course, the present invention is likely to have various alterations, modifications, and improvements which will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for estimating the frequency error of a demodulator for restoring two binary signals (I, Q) carried on two carriers of same frequency but in phase quadrature, comprising the steps of:

forming vectors having as components the successive couples of values (I, Q) of the two binary signals;

applying to each vector a transform which multiplies by four its angle at least when it is equal to a multiple of $\pi/4$ and which substantially preserves its module; and calculating the average (x1, y1) of the transformed vectors;

wherein the transform is a piecewise linear transform in which an image vector, located substantially in the same quadrant of the image plane as an image vector obtained by multiplying by four the vector angle, corresponds to each vector.

2. The frequency error estimation method of claim 1, wherein the frequency error is provided by calculating the derivative of the angle ($\phi$) of the average vector.

3. The frequency error estimation method of claim 2, wherein the derivative is provided in the form of a difference, modulo $\pi/2$, of two successive angle values.

4. The frequency error estimation method of claim 1, wherein a phase of 0 is assigned to the image vectors located in the second and third quadrants of the image plane, a phase of +1 is assigned to the image vectors located in the first quadrant, and a phase of −1 is assigned to the image vectors located in the fourth quadrant, a frequency error information being provided by the difference of the phase values assigned to the current image vector and to the preceding image vector, which difference is provided modulo 2 if it is positive, and modulo −2 if negative.

5. A system for estimating the frequency error of a demodulator for restoring two binary signals (I, Q) carried on two carriers of same frequency but in phase quadrature, comprising:

means for forming vectors having as components the successive couples of values (I, Q) of the two binary signals;

means for applying to each vector a transform which multiplies by four its angle at least when it is equal to a multiple of $\pi/4$ and which substantially preserves its module; and means for calculating the average (x1, y1) of the transformed vectors;

wherein the transform is a piecewise linear transform in which an image vector, located substantially in the same quadrant of the image plane as an image vector obtained by multiplying by four the vector angle, corresponds to each vector.

6. The system of claim 5, wherein the frequency error is provided by calculating the derivative of the angle ($\phi$) of the average vector.

7. The system of claim 6, wherein the derivative is provided in the form of a difference, modulo $\pi/2$, of two successive angle values.

8. The system of claim 5, wherein a phase of 0 is assigned to the image vectors located in the second and third quadrants of the image plane, a phase of +1 is assigned to the image vectors located in the first quadrant, and a phase of −1 is assigned to the image vectors located in the fourth quadrant, a frequency error information being provided by the difference of the phase values assigned to the current image vector and to the preceding image vector, which difference is provided modulo 2 if it is positive, and modulo −2 if negative.

9. The frequency error estimation method of claim 1, wherein a phase of 0 is assigned to the image vectors located in the second and third quadrants of the image plane, a phase of +1 is assigned to the image vectors located in the first quadrant, and a phase of −1 is assigned to the image vectors located in the fourth quadrant.

10. The frequency error estimation method of claim 9, wherein the frequency error information is provided by the difference of the phase values assigned to the current image vector and to the preceding image vector.

11. The frequency error estimation method of claim 1, wherein the frequency error information is provided by the difference of the phase values assigned to the current image vector and to the preceding image vector.

12. The frequency error estimation method of claim 11, wherein the difference is provided modulo 2 if it is positive, and modulo −2 if negative.

13. The frequency error estimation method of claim 1, wherein the piecewise linear transform is given by:

Sup=max(|I|, |Q|)
Inf=min(|I|, |Q|), and
Sgn=sign (IQ (|I|−|Q|)),
If 4Inf<Sup then x=Sup, and
    y=4SgnInf,
    else x=2Sup−4Inf, and
    y=2Sgn(Sup−Inf), where I and Q are the components of the initial vectors, and x and y are the components of the image vectors.

14. The system of claim 5, wherein a phase of 0 is assigned to the image vectors located in the second and third quadrants of the image plane, a phase of +1 is assigned to the image vectors located in the first quadrant, and a phase of −1 is assigned to the image vectors located in the fourth quadrant.

15. The system of claim 14, wherein the frequency error information is provided by the difference of the phase values assigned to the current image vector and to the preceding image vector.

16. The system of claim 5, wherein the frequency error information is provided by the difference of the phase values assigned to the current image vector and to the preceding image vector.

17. The system of claim 16, wherein the difference is provided modulo 2 if it is positive, and modulo −2 if negative.

18. The system of claim 5, wherein the piecewise linear transform is given by:

Sup=max(|I|, |Q|)
Inf=min(|I|, |Q|), and
Sgn=sign(IQ (|I|−|Q|)),
If 4Inf<Sup then x=Sup, and
    y=4SgnInf,
    else x=2Sup−4Inf, and
    y=2Sgn(Sup−Inf), where I and Q are the components of the initial vectors, and x and y are the components of the image vectors.

* * * * *